US012651953B2

(12) United States Patent
Draper et al.

(10) Patent No.: US 12,651,953 B2
(45) Date of Patent: Jun. 9, 2026

(54) VERSATILE ADAPTIVE VOLTAGE SCALING CONTROL CIRCUIT, RELATED APPARATUSES, AND RELATED METHODS

(71) Applicant: MACOM Technology Solutions Holdings, Inc., Lowell, MA (US)

(72) Inventors: Daniel Draper, Lowell, MA (US); Cristiano Bazzani, Lowell, MA (US); Nicolas Nodenot, Lowell, MA (US)

(73) Assignee: MACOM TECHNOLOGY SOLUTIONS HOLDINGS, INC., Lowell, MA (US)

( * ) Notice: Subject to any disclaimer, the term of this patent is extended or adjusted under 35 U.S.C. 154(b) by 328 days.

(21) Appl. No.: 18/222,005

(22) Filed: Jul. 14, 2023

(65) Prior Publication Data

US 2025/0023444 A1    Jan. 16, 2025

(51) Int. Cl.
*H02M 3/04*        (2006.01)
*H02M 1/00*        (2006.01)
(52) U.S. Cl.
CPC ........... *H02M 1/0048* (2021.05); *H02M 3/04* (2013.01)
(58) Field of Classification Search
CPC .............................. H02M 1/0048; H02M 3/04
See application file for complete search history.

(56) References Cited

U.S. PATENT DOCUMENTS 8,531,225 B1 * 9/2013 Hussain .................. H03K 5/133
                                                        327/276
9,323,320 B2 * 4/2016 Fitzpatrick ............ G06F 1/3296

| 11,018,599 | B1 | 5/2021 | Vinciarell |
|---|---|---|---|
| 11,133,833 | B2 | 9/2021 | Dorosenco |
| 11,696,800 | B2 | 7/2023 | Xiao |
| 11,973,420 | B2 * | 4/2024 | Nagano .................. G06F 1/305 |
| 2015/0029806 | A1 | 1/2015 | Qiao et al. |
| 2022/0368221 | A1 | 11/2022 | Nagano et al. |
| 2023/0138397 | A1 | 5/2023 | Jiang |
| 2023/0168705 | A1 | 6/2023 | Carlo Rodriguez |
| 2023/0198384 | A1 | 6/2023 | Butzen |

FOREIGN PATENT DOCUMENTS

CN        208547908 U    2/2019

OTHER PUBLICATIONS

International Search Report and Written Opinion for PCT/US24/21494 mailed Jun. 25, 2024.

* cited by examiner

*Primary Examiner* — Adolf D Berhane

(74) *Attorney, Agent, or Firm* — Perilla Knox & Hildebrandt LLP; Jason M. Perilla

(57)        ABSTRACT

A versatile adaptive voltage scaling control circuit, related apparatus, and related method are provided. A method includes monitoring one or more parameters determined to be associated with performance of a device that is driven by a direct current-to-direct current (DC-DC) converter. The method also includes determining a voltage target based on the one or more parameters and comparing the voltage target to a power supply voltage. Further, the method includes selectively adjusting an output voltage of the DC-DC converter via a feedback loop based on a result of the comparing.

20 Claims, 9 Drawing Sheets

VERSATILE ADAPTIVE VOLTAGE SCALING CONTROL CIRCUIT, RELATED APPARATUSES, AND RELATED METHODS

TECHNICAL FIELD

The subject disclosure relates generally to electrical circuit design and, in particular, to voltage scaling control circuits, apparatuses, and methods related thereto.

BACKGROUND

In various high performance integrated circuit applications, direct current-to-direct current (DC-DC) converters provide power to a device. Power savings associated with operating the device are important to minimize manufacturing and operating expenses. In terms of power savings, a conventional power saving method is to operate the device using a voltage that is set at a fixed value that is a little lower than a defined operating voltage. Another traditional power saving technique is based on clock frequency adjustment. However, such power savings techniques are limited in their operation. Accordingly, unique challenges exist related to power savings for various use cases.

It is noted that the above-described description is merely intended to provide a contextual overview of integrated circuit design and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In one or more embodiments, provided is a method that includes monitoring one or more parameters determined to be associated with performance of a device that is driven by a direct current-to-direct current (DC-DC) converter. The method also includes determining a voltage target based on the one or more parameters and comparing the voltage target to a power supply voltage. Further, the method includes selectively adjusting an output voltage of the DC-DC converter via a feedback loop based on a result of the comparing.

According to some implementations, selectively adjusting the output voltage can include, based on a first determination that the power supply voltage is less than the voltage target, changing an adaptive voltage scaling (AVS) status signal from a first value to a second value. Further to these implementations and based on changing the AVS status signal from the first value to the second value, the method includes increasing a value of the output voltage from the DC-DC converter as compared to a present value of the output voltage.

Further to the above implementations, the method can include, based on a second determination that the power supply voltage is equal to or more than the voltage target, changing the AVS status signal from the second value to the first value. In addition, the method can include, based on the changing the AVS status signal from the second value to the first value, decreasing the value of the output voltage from the DC-DC converter as compared to the present value of the output voltage. In an example, the first value is 1 (or high)

and the second value is 0 (or low). In some implementations, the method can include providing the AVS status signal as an open drain output from the device.

In some implementations, selectively adjusting the output voltage can include controlling the output voltage via a voltage divider operatively connected to a feedback node of the DC-DC converter. According to some implementations, selectively adjusting the output voltage comprises controlling the output voltage via an Inter-Integrated Circuit control. Further, in some implementations, monitoring the one or more parameters can include monitoring one or more process monitors.

Another embodiment relates to an apparatus that includes a direct current-to-direct current (DC-DC) converter configured to control at least one device. The apparatus also includes an adaptive voltage scaling (AVS) controller operatively connected to the DC-DC converter. The AVS controller can be configured to selectively adjust an output voltage of the DC-DC converter based on a result of a comparison of a voltage target and a power supply voltage.

According to some implementations, the AVS controller can include a control loop operatively connected to a switch node of the DC-DC converter. The AVS controller can also include a digital to analog converter (DAC) operatively connected to a feedback node of the DC-DC converter.

Further to the above implementations, the apparatus can include a voltage divider operatively connected to the DC-DC converter and the AVS controller and a resistor comprising a first terminal and a second terminal. The first terminal is operatively connected to the DAC and the voltage divider, and the second terminal is connected to electrical ground. According to some implementations, the AVS controller and the resistor are operatively connected in a series configuration.

In an implementation, the resistor is a first resistor and the voltage divider comprises a second resistor and a third resistor. The second resistor and the third resistor are operatively connected to a feedback node of the DC-DC converter.

The output of the AVS controller can be sourced into the voltage divider. Further, the AVS controller facilitates an adjustment of the output voltage from the DC-DC converter via a feedback node.

In an implementation, the apparatus is a primary device of a primary/secondary device relationship. Further, secondary devices of the primary/secondary device relationship are operatively connected to the primary device via a single connection point.

In an alternative or additional implementation, the apparatus is a microcontroller operatively connected to a die-to-die interface comprising a plurality of dies. Further to this implementation, the DC-DC converter is controlled via an Inter-Integrated Circuit.

A further embodiment relates to a method that can include operatively connecting a direct current-to-direct current (DC-DC) converter and an adaptive voltage scaling (AVS) controller. The method can also include adjusting, by the AVS controller, an output voltage of the DC-DC converter via a feedback loop based on a result of a comparison between a voltage target and a power supply voltage.

According to some implementations, adjusting the output voltage can include, based on a first determination that the power supply voltage is less than the voltage target, driving an adaptive voltage scaling (AVS) status signal from a first value to a second value. The method can also include, based on driving the AVS status signal from the first value to the second value, increasing a value of the output voltage from the DC-DC converter as compared to a present value of the output voltage.

In some implementations, the method can include, based on a second determination that the power supply voltage is equal to or more than the voltage target, driving the AVS status signal from the second value to the first value. The method can also include, based on driving the AVS status signal from the second value to the first value, increasing the value of the output voltage from the DC-DC converter as compared to the present value of the output voltage.

The method can include, according to some implementations, operatively connecting a feedback node of the DC-DC converter to a voltage divider that comprises a first resistor and a second resistor connected in a series configuration. The method can also include operatively connecting a third resistor in series with the DAC converter. A first terminal of the second resistor is connected to the first resistor and the feedback node. A second terminal of the second resistor is connected to a first terminal of the third resistor and the DAC converter. A second terminal of the third resistor is connected to electrical ground.

DETAILED DESCRIPTION

Figure 1:
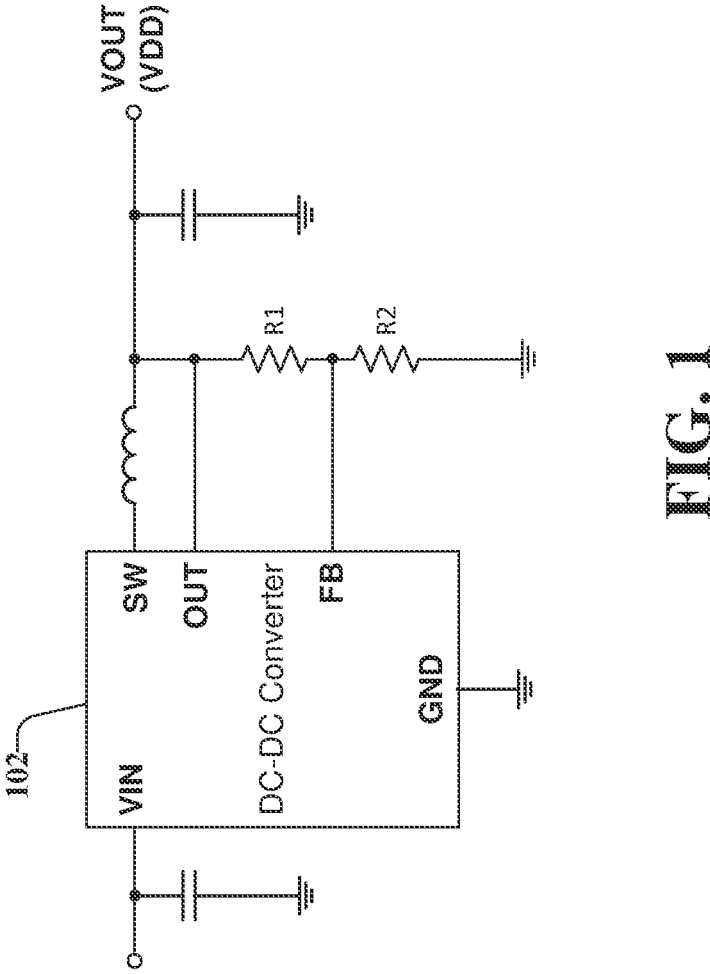
FIG. 1 illustrates an example, non-limiting, diagram of a circuit for a traditional DC-DC converter with external feedback.
Figure 1:

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

In various traditional use cases, there are direct current-to-direct current (DC-DC) converters that provide power to a device (e.g., a load or device load). In terms of power savings, a conventional method operates the device load using a voltage that is set at a fixed value that is a little lower than a defined operating voltage.

Traditionally, in the digital application-specific integrated circuit (ASIC) realm, voltage scaling can be performed to adjust the voltage based on one or more operating conditions (e.g., clock frequency) in the digital ASIC. For example, when the clock frequency is higher than a set amount, the voltage can be increased. Alternatively, when the clock frequency is lower than the set amount, the voltage level can be reduced. Usually, there is a dedicated energy control that is interfacing (e.g., communicating) with the digital ASIC to adjust its output conditions based on the operating conditions of the digital ASIC.

In the case of analog and mixed signal devices, which might have a large amount of Complementary Metal-Oxide-Semiconductor (CMOS) content, when there is a higher frequency, the device will dissipate more power and the frequency and the power scales proportionally to the supply voltage squared. Accordingly, there is value in reducing the voltage, if possible. The Integrated circuit (IC) is designed to meet the performance targets over the process, temperature, and power supply variations. Due to this, however, the device will generally meet performance targets under, not necessarily nominal, but worst case conditions. There will be the ability to monitor some key parameters of the device and adjust the voltage based on those parameters. Thus, the supply voltage is being operated at a lower voltage in order to conserve power.

The various embodiments herein provide a versatile and expandable adaptive voltage scaling (AVS) control method used for power savings. The disclosed embodiments are compatible with various direct current to direct current (DC-DC) converters, including conventional DC-DC converters. The power savings provided by the disclosed embodiments are adaptable to scaling.

Further, the disclosed embodiments are able to interface with a standard DC-DC converter (e.g., available off the shelf), with a minimal PIN count (e.g., a standard PIN count), allowing for wider application and easier deployment. Further, the disclosed embodiments can be enabled with minimal overhead to control the DC-DC converter in order to operate the device at an optimal voltage. Additionally, the disclosed embodiments facilitate the use of a single DC-DC converter to control supply voltages of multiple devices. The multiple devices can be devices on the same Printed Circuit Board (PCB) and/or the same module.

FIG. 1 illustrates an example, non-limiting, diagram of a circuit 100 for a traditional DC-DC converter with external feedback. It is noted that the circuit 100 illustrated in FIG. 1 is a simplified circuit, as some components not necessary for understanding the circuit may have been omitted for sake of brevity.

The circuit 100 includes a DC-DC converter 102 that includes an input node (VIN), a switch node (SW), an output node (OUT), and a feedback node (FB). The circuit 100 also includes a voltage divider that comprises a first resistor R1 in series with a second resistor R2. The second resistor R2 is connected to electrical ground. The feedback node (FB) is operatively connected between the two resistors (R1 and R2). In this case, the DC-DC converter 102 provides a fixed output voltage (VOUT) (VDD) based on the ratio of the respective values of R1 and R2. Thus, control of the output voltage is fixed based on the respective values of R1 and R2.

Figure 2:
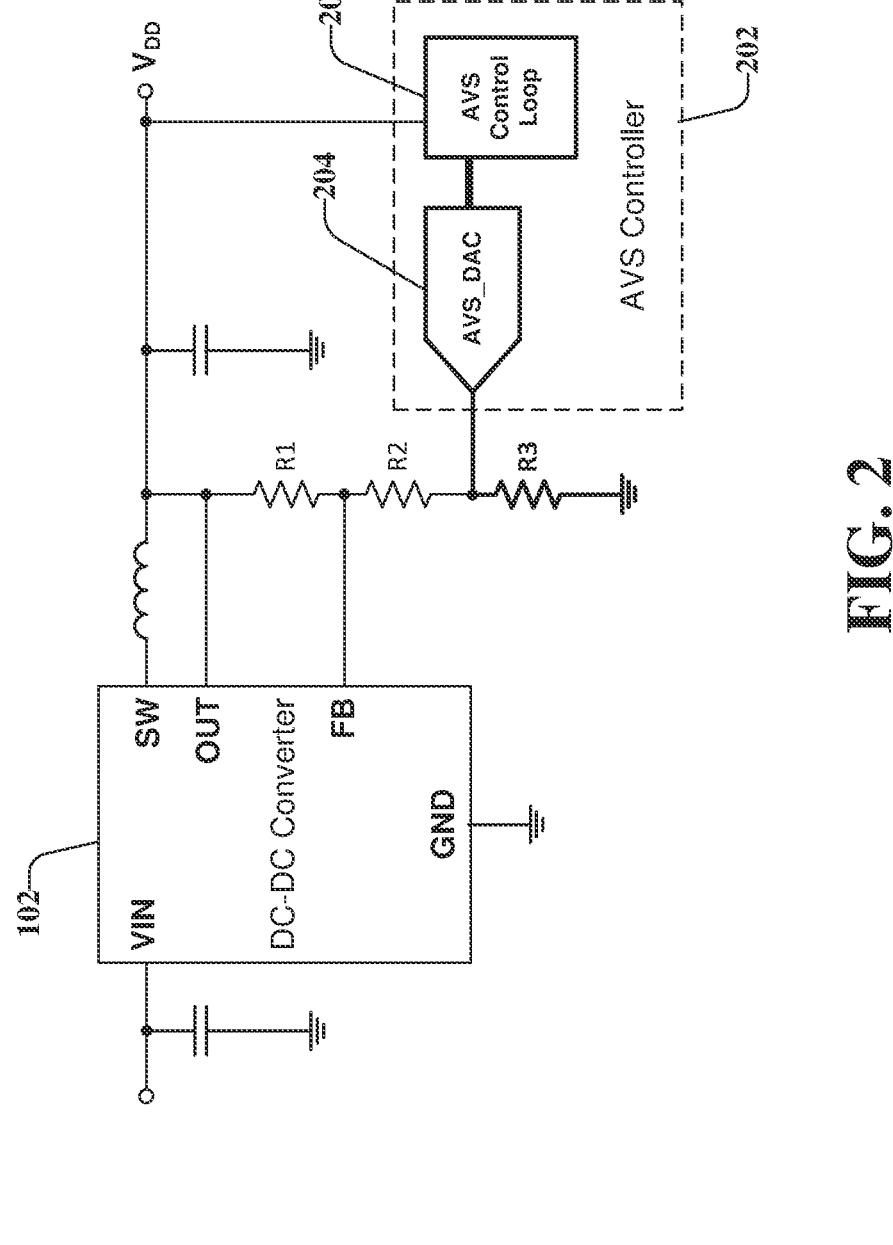
FIG. 2 illustrates an example, non-limiting, diagram of a circuit for a DC-DC converter that includes adaptive voltage scaling (AVS) control in accordance with one or more embodiments described herein.

FIG. 2 illustrates an example, non-limiting, diagram of a circuit 200 for a DC-DC converter that includes adaptive voltage scaling (AVS) control in accordance with one or more embodiments described herein. Repetitive description of like elements employed in other embodiments described herein is omitted for sake of brevity. It is noted that the circuit 200 illustrated in FIG. 2 is a simplified circuit, as some components not necessary for understanding the circuit may have been omitted for sake of brevity.

The disclosed embodiments are configured to provide power savings by regulating an amount of power (e.g., input voltage) necessary to operate a device (e.g., VOUT or VDD). In the embodiment of FIG. 2, the circuit 200 includes a device with AVS control, referred to as an AVS controller 202. The AVS controller 202 includes an AVS digital to analog converter (AVS_DAC 204) and an AVS control loop 206. Similar to the circuit 100 of FIG. 1, the feedback node (FB) is operatively connected to the voltage divider (e.g., between R1 and R2). In the embodiment of FIG. 2, a third resistor R3 is added in series with the AVS-DAC 204. R3 is also operatively connected between R2 and electrical ground. Thus, R2 is no longer directly connected to electrical ground.

As illustrated, the AVS control loop 206 is operatively connected to the DC-DC converter output (VDD). Thus, a transfer function in the feedback output of the DC-DC converter 102 to the feedback node (FB) can be adjusted by the AVS-DAC 204. By adding R3, in series with the AVS-DAC 204, small adjustments to the transfer function can be implemented based on a minimum voltage and a maximum voltage (e.g., a defined range) defined for the device. Therefore, the AVS-DAC 204 can implement small increments of adjustment over the defined range. Accordingly, as will be discussed in further detail below, there can be small fluctuations around the target voltage as the adjustments are continually being made to the output of the DC-DC converter 102 during operation.

Figure 3:
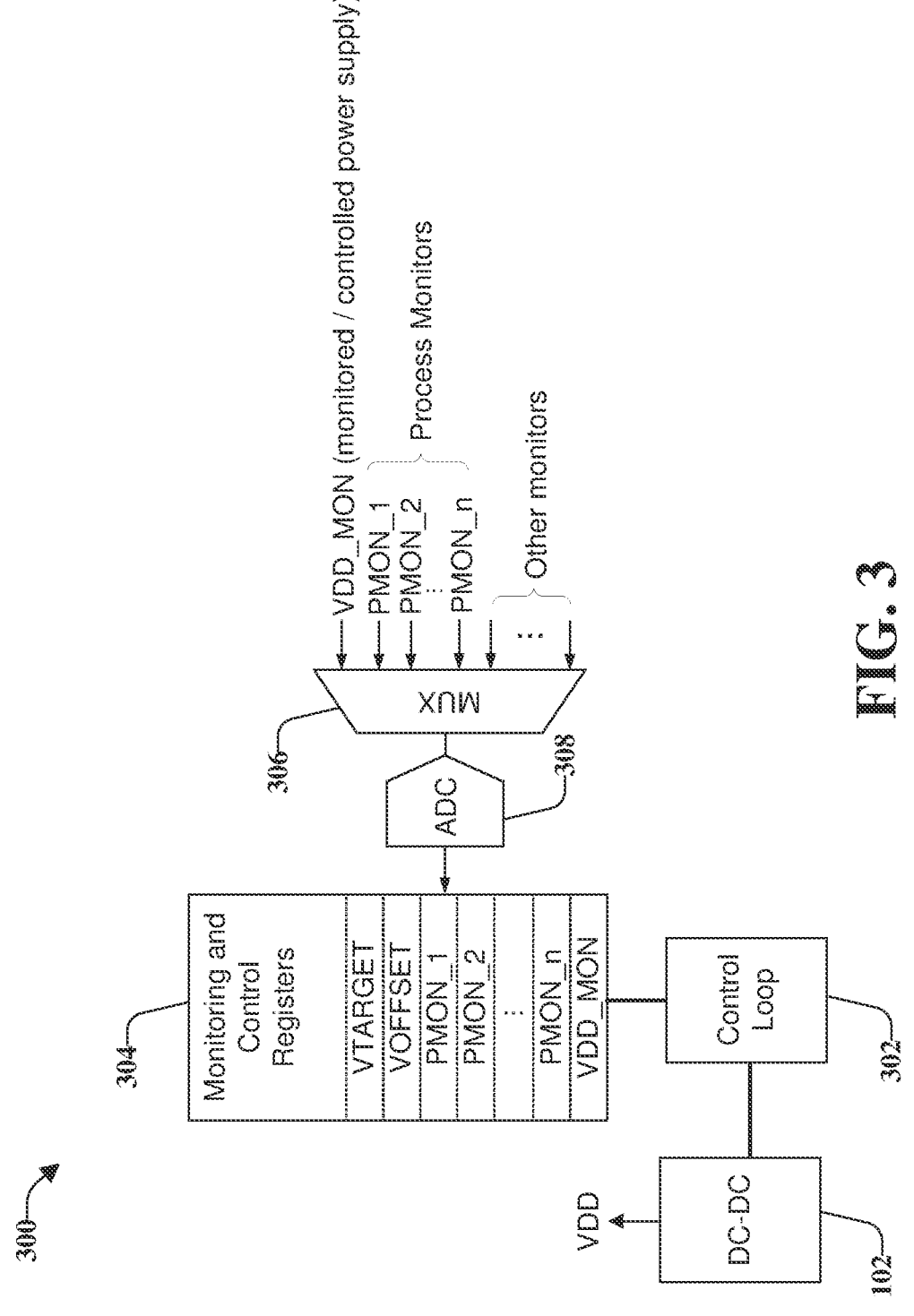
FIG. 3 illustrates an example, non-limiting, simplified control loop view of a circuit in accordance with one or more embodiments described herein.

FIG. 3 illustrates an example, non-limiting, simplified control loop view of a circuit 300 in accordance with one or more embodiments described herein. Repetitive description of like elements employed in other embodiments described herein is omitted for sake of brevity. It is noted that the circuit 300 illustrated in FIG. 3 is a simplified circuit, as some components not necessary for understanding the circuit may have been omitted for sake of brevity.

As illustrated, the DC-DC converter 102 is operatively connected to a control loop 302 (e.g., the AVS control loop 206). The control loop 302 monitors one or more processes (which can be critical processes) and/or device parameters (PMON) that can affect device performance. The number of processes or device monitors can vary depending on the requirements of a particular design. As illustrated, the monitoring and control registers 304 can include a voltage target (VTARGET), a voltage offset (VOFFSET), and multiple process monitors (e.g., PMON_1, PMON_2, through PMON-n, where n is an integer equal to or larger than zero), and a VDD monitor (VDD_MON) that monitors the output of the DC-DC converter 102. The various process monitors are types of device monitoring within the process and are representative or proportional to the device performance. The VDD monitor is a monitoring and/or controlled power supply (e.g., the actual VDD output voltage).

A multiplexer (MUX 306) allows for the selection of one or more of the monitoring and control registers 304, via an analog to digital converter (ADC 308). The selection via the MUX 306 can be a selection of one or more of the VDD_MON, PMON_1, PMON_2, through PMON_n, and/or other processes and/or device parameters.

Based on the monitoring characteristics of the one or more PMONs and one or more defined parameters, automatic or dynamic adjustment can be made based on feedback information sent to the DC-DC converter 102 the AVS_DAC 204. For example, a decision can be made as to how the target voltage should be adjusted relative to the VDD_MON and adjustment parameters can be conveyed to the DC-DC converter 102. It is noted that the value of the VTARGET can be established based on the PMON. The AVS_DAC 204 of FIG. 2 is adjusted to obtain a VDD voltage that is as close as possible to VTARGET.

Figure 4:
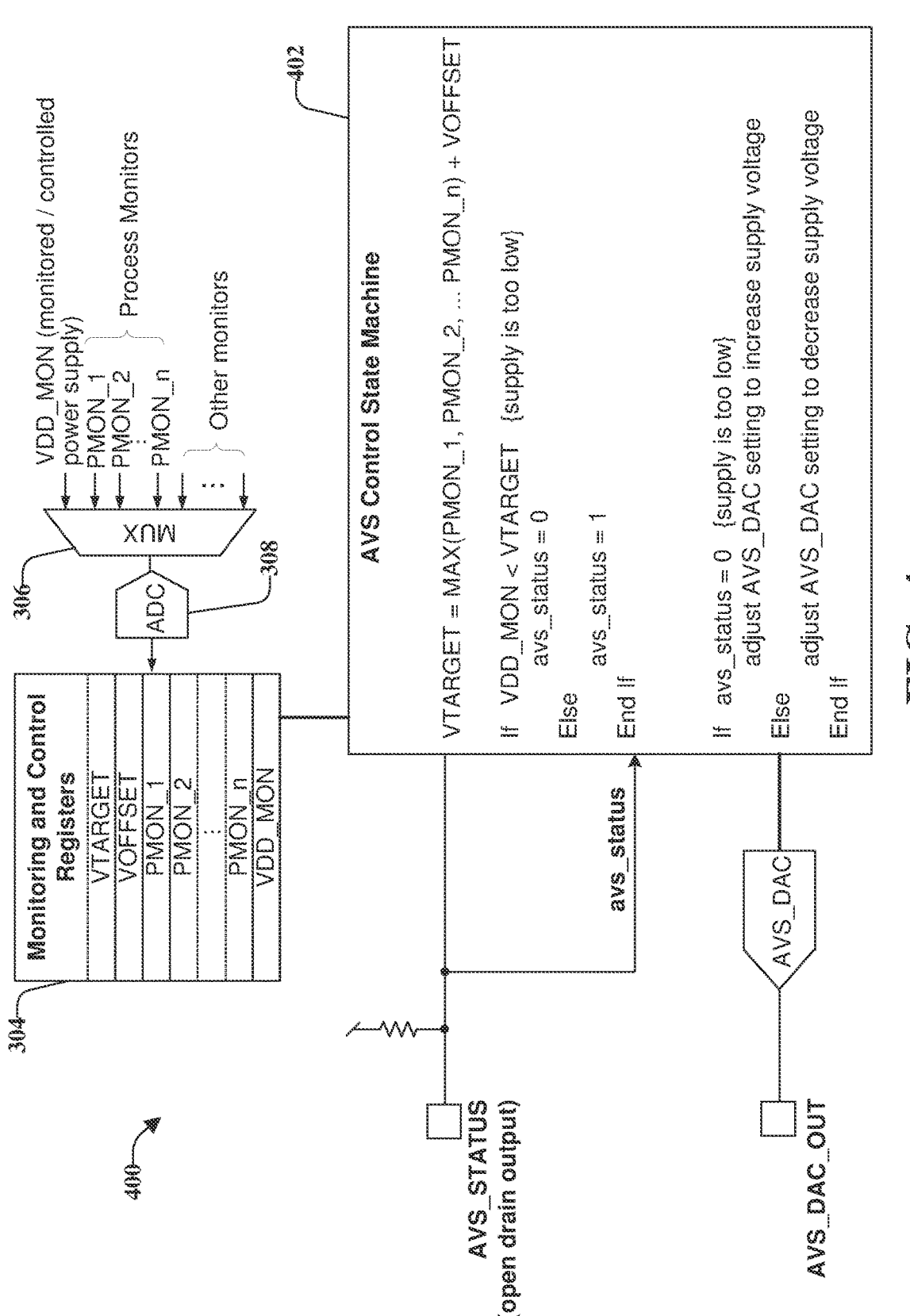
FIG. 4 illustrates an example, non-limiting, circuit depicting control loop details in accordance with one or more embodiments described herein.

FIG. 4 illustrates an example, non-limiting, circuit 400 depicting control loop details in accordance with one or more embodiments described herein. Repetitive description of like elements employed in other embodiments described herein is omitted for sake of brevity. It is noted that the circuit 400 illustrated in FIG. 4 is a simplified circuit, as some components not necessary for understanding the circuit may have been omitted for sake of brevity.

Illustrated is an AVS control state machine 402 that is configured to evaluate a status of the AVS (AVS_STATUS) and determine how to adjust the supply voltage. For example, below is an equation (Equation 1) that can be utilized by the AVS control state machine 402:

$$
\begin{aligned}
VTARGET = &\quad \text{Equation 1}\\
&MAX(PMON\_1, PMON\_2, \ldots PMON\_n) + VOFFSET\\
&\text{If } VDD\_MON < VTARGET\{\text{supply is too low}\}\\
&\qquad avs\_status = 0\\
&\qquad \text{Else}\\
&\qquad avs\_status = 1\\
&\qquad \text{End If}\\
&\quad \text{If } avs\_status = 0\{\text{supply is to low}\}\\
&\quad \text{adjust } AVS\_DAC \text{ setting to increase supply voltage}\\
&\qquad \text{Else}\\
&\quad \text{adjust } AVS\_DAC \text{ setting to decrease supply voltage}\\
&\qquad \text{End If.}
\end{aligned}
$$

VOFFSET can be used to account for any internal voltage drop differences and/or provide other adjustment margins. The power supply voltage being controlled is also monitored (VDD_MON) and compared to VTARGET. If VDD_MON is less than VTARGET, it indicates that the supply voltage level is too low. In this case, an AVS_STATUS signal is driven low and the AVS_DAC is adjusted to increase the output voltage from the DC-DC converter. Otherwise, AVS_STATUS signal is driven high and the AVS_DAC is adjusted to decrease the output voltage from the DC-DC converter.

The AVS_STATUS signal is provided as an open drain output from the device, thereby allowing the status outputs of multiple dies to be connected together in a wired-OR configuration. This provides the option to connect devices in a Primary/Secondary configuration using only one pin (e.g., a single connection point), and use a single DC-DC converter to supply multiple dies, thereby saving both board space and cost. Further details related to these embodiments will be provided with respect to the following figures.

As discussed above, the reason that the status of the bit is set low or to "0" is to allow for a wired "OR" configuration to allow for scalability. Thus, the various embodiments discussed herein can be extended to multiple devices that are powered by the same DC-DC converter. In this way, if at least one device of the multiple devices is determined to have a low voltage (e.g., a voltage level that does not satisfy the threshold level), the system will hold the signal low and set the AVS_STATUS low, which indicates that the supply voltage amount should be increased.

Thus, there can be a primary device, or a single device, that is operated by the DC-DC converter and if the status is low, the supply voltage can be increased by increasing the AVS_DAC. Alternatively, if the status is high, it will decrease the voltage level of the supply voltage.

Figure 5:
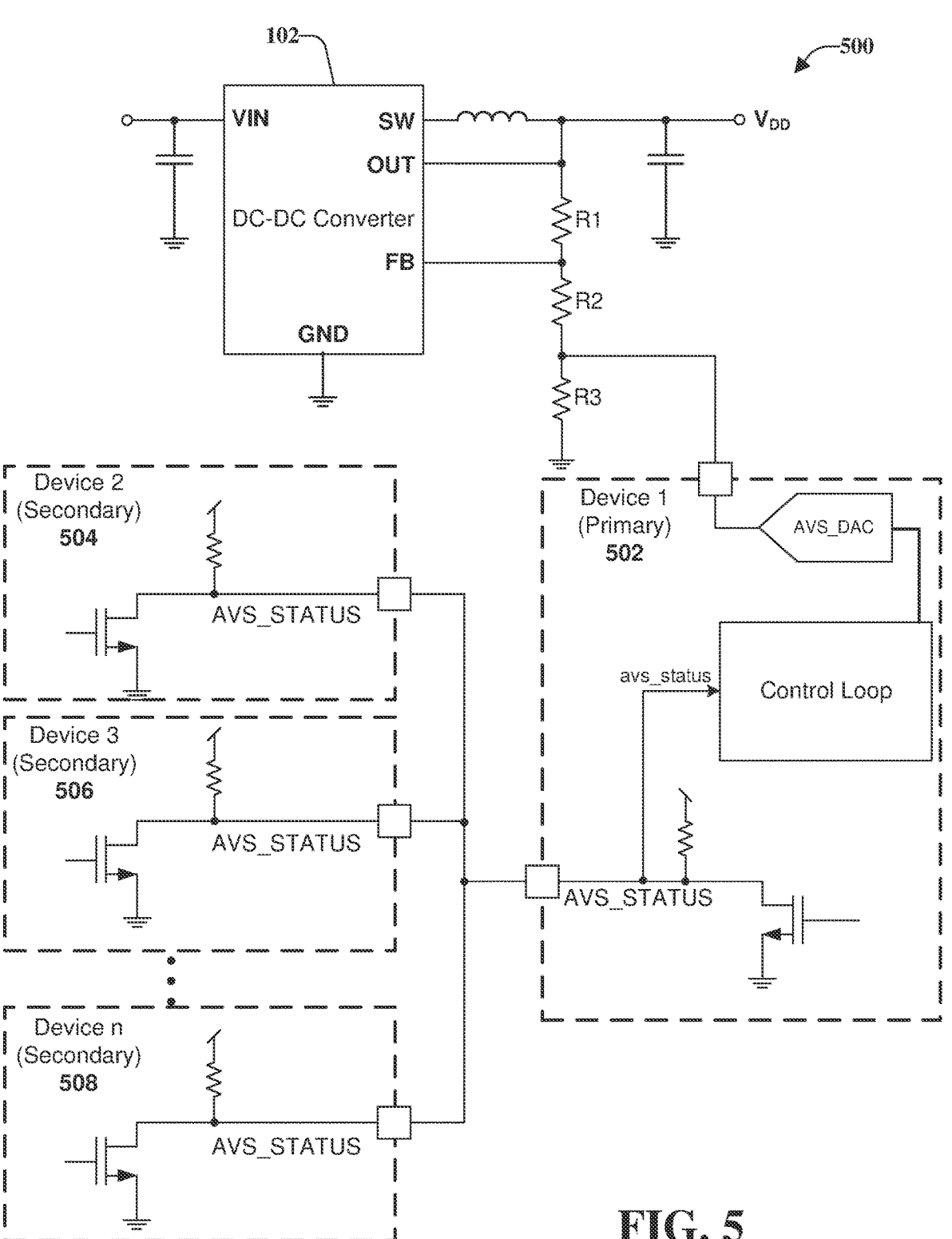
FIG. 5 illustrates an example, non-limiting, block diagram of a system configured to provide an AVS control procedure for a primary device and one or more secondary devices in accordance with one or more embodiments described herein.

FIG. 5 illustrates an example, non-limiting, block diagram of a system 500 configured to provide an AVS control procedure for a primary device and one or more secondary devices in accordance with one or more embodiments described herein. Repetitive description of like elements employed in other embodiments described herein is omitted for sake of brevity. It is noted that the system 500 illustrated in FIG. 5 is a simplified system, as some components not necessary for understanding the circuit may have been omitted for sake of brevity.

The system 500 includes the DC-DC converter 102, a voltage divider (e.g., R1 and R2), and R3. The system 500 also includes a first device, which is a primary device 502 (Device 1). Further, the system 500 includes one or more secondary devices, illustrated as a second device 504 (Device 2), a third device 506 (Device 3), through an nth device 508 (Device n), where n is an integer greater than or equal to zero. In this embodiment, the primary device 502 and the one or more secondary devices (e.g., the second device 504, the third device 506, and the nth device 508 are operated by the same DC-DC converter (e.g., the DC-DC converter 102).

Each device has a respective AVS_STATUS, which are operatively connected in a wired "OR" configuration. If at least one device is pulling low (e.g., determined to have a low output voltage), the supply voltage needs to be increased. In this embodiment, there is only one device (e.g., the primary device 502) that is performing the monitor and control. Therefore, the primary device generates its own parameters as well as the respective AVS_STATUS signals from the secondary devices. Based on its own parameters and the respective AVS_STATUS signals, the primary device 502 will adjust the DC-DC converter 102 output voltage to the minimum level needed to satisfy the requirements of all the devices powered by the DC-DC converter 102.

For example, if any of the AVS_STATUS signals are determined to be low, the primary device 502 facilitates an adjustment at the DAC to increase the supply voltage. Alternatively, if any of the AVS_STATUS signals are determined to be high, the primary device 502 facilitates an adjustment at the DAC to decrease the supply voltage.

The embodiment of FIG. 5 uses one pin to interface with the DC-DC converter. Thus, a traditional DC-DC converter can be utilized with the disclosed embodiments (e.g., a specialized DC-DC converter is not necessary).

Figure 6:
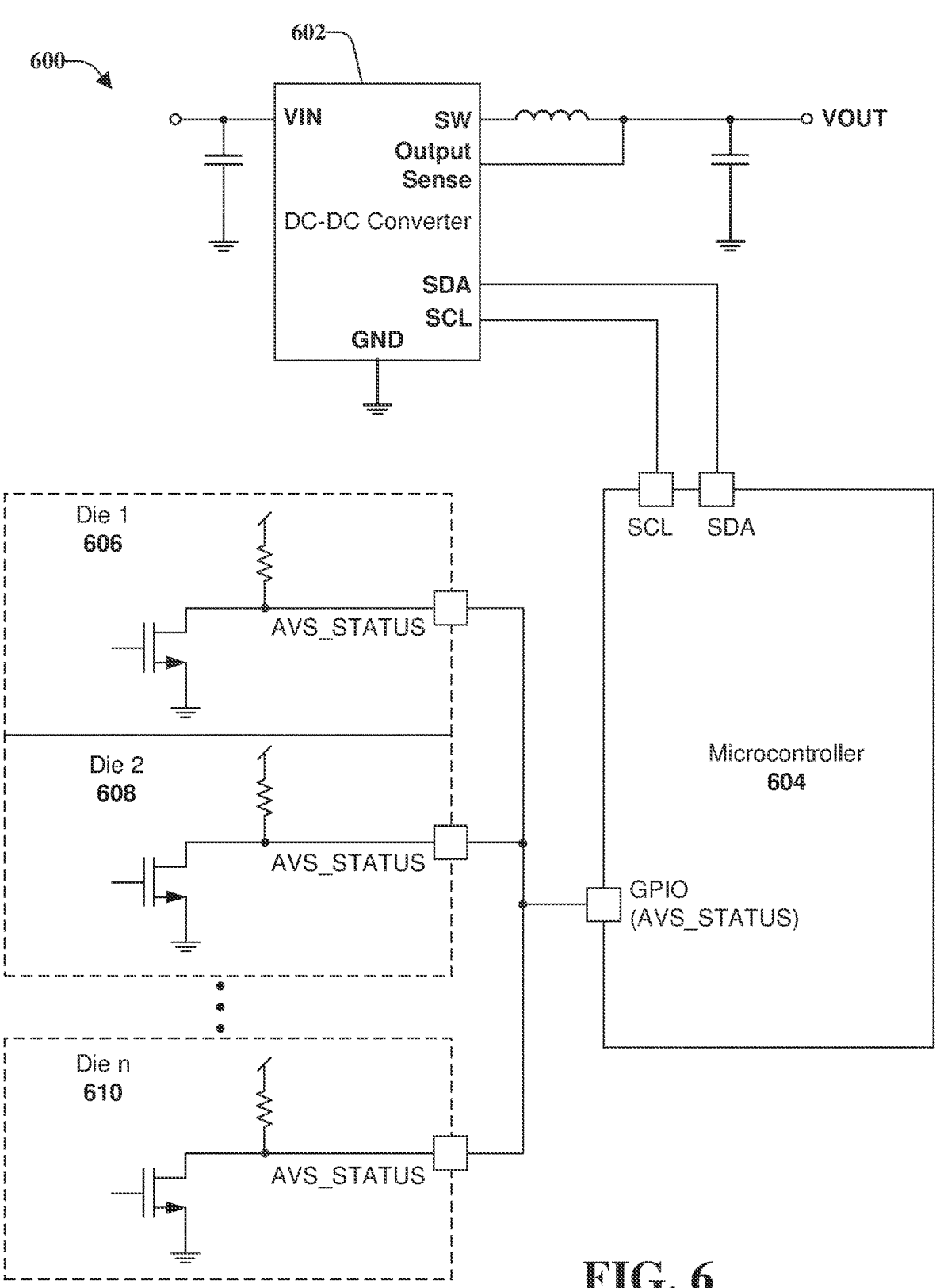
FIG. 6 illustrates an example, non-limiting, block diagram of a system configured to provide an AVS control procedure for use with a DC-DC Converter that is controlled via Inter-Integrated Circuit control in accordance with one or more embodiments described herein.

FIG. 6 illustrates an example, non-limiting, block diagram of a system 600 configured to provide an AVS control procedure for use with a DC-DC Converter that is controlled via Inter-Integrated Circuit (I2C) control in accordance with one or more embodiments described herein. Repetitive description of like elements employed in other embodiments described herein is omitted for sake of brevity. It is noted that the system 600 illustrated in FIG. 6 is a simplified system, as some components not necessary for understanding the circuit may have been omitted for sake of brevity.

This control method discussed with respect to FIG. 5 is also compatible with DC-DC converters that are adjusted through I2C control instead of using an external voltage divider. For DC-DC converters controlled via I2C, the external microcontroller that controls the DC-DC converter output voltage can monitor the AVS_STATUS signal from one or more devices and can adjust the DC-DC converter output voltage up or down as necessary to the minimum level needed to satisfy the requirements of all the devices powered by the DC-DC converter. Alternatively, the device incorporating the AVS control techniques discussed herein could also contain I2C that can be connected directly to the DC-DC converter if an external microcontroller is not used in the application.

In further detail, I2C allows for multiple devices to be operatively connected to one another using only two wires. It is noted that, according to some implementations, the multiple devices can also be cooperatively connected to a common electrical ground wire. The two wires include a Serial Data Line (SDA) and a Serial Clock Line (SCL). The devices (e.g., master and slave devices, primary and secondary devices, and so on) send and/or receive data over the SDA. The SCL carries the clock signal that is generated by the master or primary device.

The system 600 includes a DC-DC converter 602 that includes a voltage input (VIN), a switch port (SW), an output sense port, an SDA port (SDA), and an SCL port (SCL). A microcontroller 604 is operatively connected to the SDA port and SCL port of the DC-DC converter 602. Also illustrated is a die-to-die interface that includes a first Die 606 (Die 1), a second die 608 (Die 2), through an nth die 610 (Die n), where n is an integer greater than or equal to zero.

In operation via the I2C, a target voltage can be set based on I2C register settings, which can be controlled by the microcontroller 604. In this embodiment, the status signals are summed together and processed through an input and/or output (I/O) pin, which can be a General Purpose I/O (GPIO) of the microcontroller 604. The microcontroller 604 monitors the statuses and determines whether the status is low or high. Based on the determination, the microcontroller 604 sends, to the DC-DC converter 602, information indicative of whether the output voltage value should be increased or decreased. The commonality in this embodiment is the status signal between the devices or Die (e.g., Die 1, Die 2, Die n). In this embodiment, the DAC can be in an analog form that can be adjusted directly within the apparatus that comprises the system 600.

Figure 7:
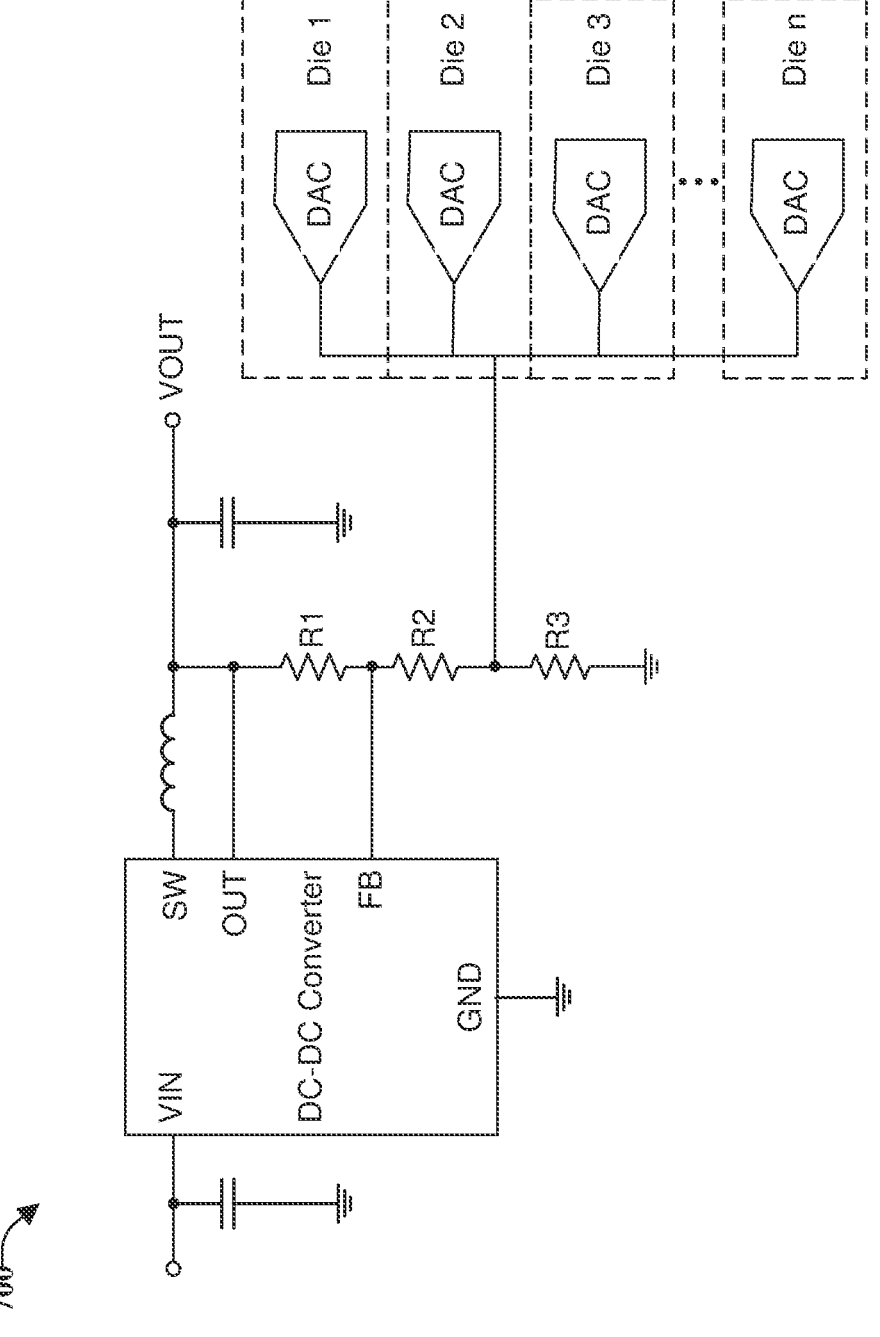
FIG. 7 illustrates an example, non-limiting, block diagram of another embodiment of a system configured with an alternative control method using summed DAC outputs in accordance with one or more embodiments described herein.

FIG. 7 illustrates an example, non-limiting, block diagram of another embodiment of a system 700 configured with an alternative control method using summed DAC outputs in accordance with one or more embodiments described herein. Repetitive description of like elements employed in other embodiments described herein is omitted for sake of brevity. It is noted that the system 700 illustrated in FIG. 7 is a simplified system, as some components not necessary for understanding the circuit may have been omitted for sake of brevity.

As illustrated, the system 700 includes a DC-DC converter 702, a voltage divider comprising a first resistor R1 and a second resistor R2, a third resistor R3, and a die-to-die interface, which includes a first die 704 (Die 1), a second die 706 (Die 2), a third die 708 (Die 3), through an nth die 710 (Die n), where n is an integer greater than or equal to zero. In the embodiment of FIG. 7, each die includes a DAC. As illustrated, the first die 704 includes a first DAC, the second die 706 includes a second DAC, the third die 708 includes a third DAC, and the nth die includes an nth DAC. In this embodiment, the DACs (the first DAC, the second DAC, the third DAC, the nth DAC) are operatively connected together. Accordingly, the system 700 will attempt to adjust the voltage up or down based on whether the signal is too high or too low. Each device will attempt to control the system based on one or more defined conditions.

The embodiment of FIG. 7 can have a predictable behavior during start up. Each device, however, looks at its own conditions and attempts to adjust the voltage based on its own condition. For example, the system 700 would be sourcing current from the DAC. The more current that is sourced, the lower the voltage will be. Ultimately each device would try to make its own adjustment. The one that leads to the lowest voltage will end up winning in terms of the supply voltage. They are all working together and summed for each DAC. It is noted that the transition in this embodiment will not be a smooth transition.

In an alternative implementation, a slightly different configuration of the system 700 of FIG. 7 could be used where the DACs sink current, thereby increasing the voltage. In this alternative implementation, the one that leads to the most voltage would win, which can be the preferred outcome in the alternative implementation.

Figure 8:
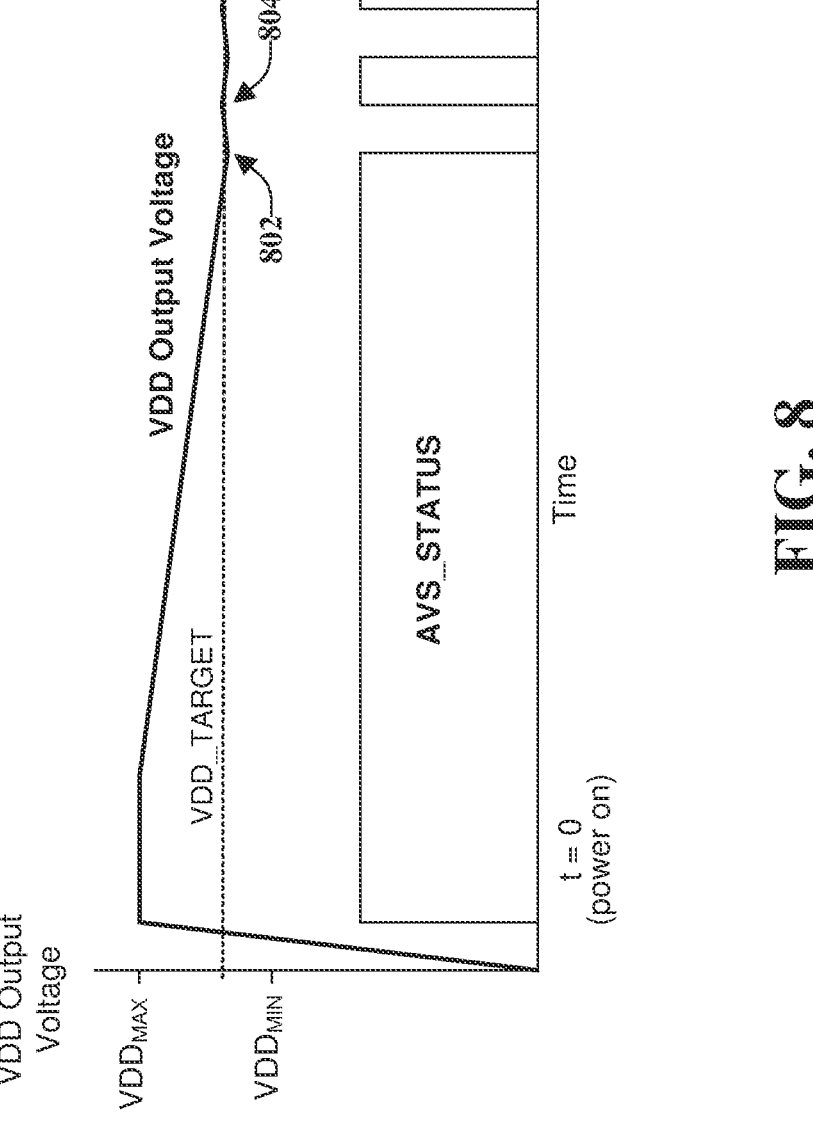
FIG. 8 illustrates an example, non-limiting, chart of a VDD output voltage behavior following power-on with adaptive voltage scaling control in accordance with one or more embodiments described herein.

FIG. 8 illustrates an example, non-limiting, chart 800 of the VDD output voltage behavior following power-on with adaptive voltage scaling control in accordance with one or more embodiments described herein.

In FIG. 8, the VDD output voltage is illustrated on the vertical axis and time is illustrated on the horizontal axis. At time zero (t=0), or power up, the default is that the system will start at the highest voltage, and the most power dissipation, which would support operation under all conditions. Accordingly, at time to, the VDD output voltage goes to its highest level and the AVS_STATUS is high. Upon or after power up, the VDD is reduced (slowly) toward the VDD_TARGET. When the VDD output voltage reaches the VDD_TARGET, as indicated at 802, the AVS_STATUS goes low and the VDD Output voltage level will begin to rise. When the VDD Output Voltage is above the VDD_TARGET, at 804, the AVS_STATUS will go high, causing the VDD Output Voltage to begin to decrease. This process continues and the voltage will toggle back and forth or fluctuate (above and below) the target. Thus, the voltage will be either too high or too low (e.g., will dither at that point). However, this voltage level fluctuation is small enough that it will not have impact on the device performance.

Methods that can be implemented in accordance with the disclosed subject matter will be better appreciated with reference to the above flow charts. While, for purposes of simplicity of explanation, the methods are shown and described as a series of acts or blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 9:
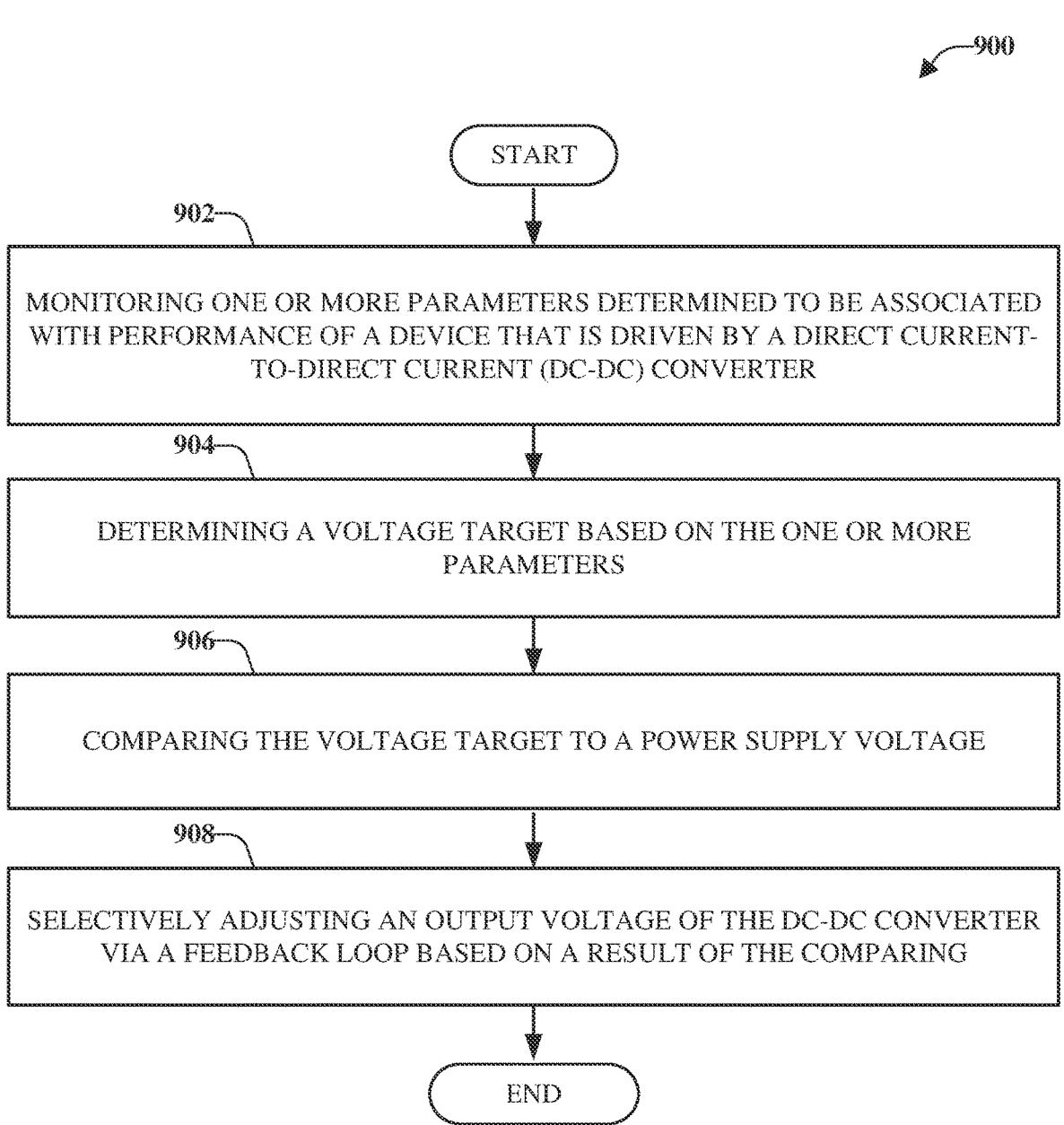
FIG. 9 illustrates an example, non-limiting, method for facilitating versatile adaptive voltage scaling control in accordance with one or more embodiments described herein.

FIG. 9 illustrates an example, non-limiting, method 900 for facilitating versatile adaptive voltage scaling control in accordance with one or more embodiments described herein. Repetitive description of like elements employed in other embodiments described herein is omitted for sake of brevity. The method 900 and/or other methods discussed herein can be implemented by the circuit 200 of FIG. 2, the circuit 300 of FIG. 3, the circuit 400 of FIG. 4, the system 500 of FIG. 5, the system 600 of FIG. 6, and/or the system 700 of FIG. 7.

The method 900 starts at 902, with monitoring one or more parameters determined to be associated with performance of a device that is driven by a direct current-to-direct current (DC-DC) converter. The one or more parameters can include the monitoring and control registers 304 of FIG. 3.

At 904, a voltage target is determined based on the one or more parameters. Further, at 906, the voltage target is compared to a power supply voltage. An output voltage of the DC-DC converter is selectively adjusted, at 908, via a feedback loop based on a result of the comparing.

For example, selectively adjusting the output voltage at 908 can include, based on a first determination that the power supply voltage is less than the voltage target, changing an adaptive voltage scaling (AVS) status signal from a first value to a second value. Additionally, based on changing the AVS status signal from the first value to the second value, the method can include increasing a value of the output voltage from the DC-DC converter as compared to a present value of the output voltage. The first value can be a high value, or a value of 1, and the second value can be a low value, or a value of 0.

Further, selectively adjusting the output voltage at 908 can include, based on a second determination that the power supply voltage is equal to or more than the voltage target, changing the AVS status signal from the second value to the first value. Further, based on the changing of the AVS status signal from the second value to the first value, the method can include decreasing the value of the output voltage from the DC-DC converter as compared to the present value of the output voltage.

As discussed, critical process or device parameters affecting performance can be monitored and a controller can adjust the DC-DC converter output voltage to the minimum level that satisfies each of the parameters. DC-DC converters can utilize a voltage divider from their output to a feedback node to control their output voltage level. Provided is a DAC, whose output is connected to the voltage divider at the DC-DC converter. The DAC output is sourced into the voltage divider to alter the transfer function, thereby adjusting the output voltage from the DC-DC converter. A control loop monitors the critical process or device parameters (PMON) that affect device performance. The number of process or device monitors can vary depending on the requirements of a particular design.

A target output voltage, VTARGET, is then determined as follows: VTARGET=MAX (PMON_1, PMON_2, . . . . PMON_n)+VOFFSET, where VOFFSET can be used to account for any internal voltage drop differences or provide some other adjustment margin. The power supply voltage being controlled is also monitored (VDD_MON) and compared to VTARGET. If VDD_MON is less than VTARGET, an AVS_STATUS signal is driven low and the AVS_DAC is adjusted to increase the output voltage from the DC-DC converter. Otherwise, AVS_STATUS signal is driven high and the AVS_DAC is adjusted to decrease the output voltage from the DC-DC converter. The AVS_STATUS signal is provided as an open drain output from the device, thereby allowing the status outputs of multiple dies to be connected together in a wired-OR configuration. This provides the option to connect devices in a Primary/Secondary configuration using only one pin, and to use a single DC-DC converter to supply multiple dies, thereby saving both board space and cost. In this case, the Primary device will monitor its own parameters as well as the AVS_STATUS signal from each Secondary device and adjust the DC-DC converter output voltage to the minimum level needed to satisfy the requirements of all the devices powered by the DC-DC converter.

The control method is also compatible with DC-DC converters that are adjusted through I2C control instead of using an external voltage divider. For DC-DC converters controlled via I2C, the external microcontroller that controls the DC-DC converter output voltage can monitor the AVS_STATUS signal from one or more devices, and adjust the DC-DC converter output voltage up or down as needed to the minimum level needed to satisfy the requirements of all the devices powered by that DC-DC converter. Alternatively, the device incorporating the AVS control as provided herein could also contain I2C that could be connected directly to the DC-DC converter if an external microcontroller is not used in the application.

Reference throughout this specification to "one embodiment," "an embodiment," "an example," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "engine," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

Other than in the operating examples, if any, or where otherwise indicated, all numbers, values and/or expressions referring to parameters, measurements, conditions, etc., used in the specification and claims are to be understood as modified in all instances by the term "about."

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A method, comprising:
   monitoring one or more parameters associated with performance of a primary device and one or more secondary devices that are driven by a direct current-to-direct current (DC-DC) converter;
   determining a voltage target based on the one or more parameters;

comparing the voltage target to a power supply voltage; and
selectively adjusting an output voltage of the DC-DC converter via a feedback loop based on a result of the comparing.

2. The method of claim 1, wherein the selectively adjusting the output voltage comprises:
   based on a first determination that the power supply voltage is less than the voltage target, changing an adaptive voltage scaling (AVS) status signal from a first value to a second value; and
   based on the changing the AVS status signal from the first value to the second value, increasing a value of the output voltage from the DC-DC converter as compared to a present value of the output voltage.

3. The method of claim 2, further comprising:
   based on a second determination that the power supply voltage is equal to or more than the voltage target, changing the AVS status signal from the second value to the first value; and
   based on the changing the AVS status signal from the second value to the first value, decreasing the value of the output voltage from the DC-DC converter as compared to the present value of the output voltage.

4. The method of claim 2, wherein the first value is 1 and the second value is 0.

5. The method of claim 2, further comprising:
   providing the AVS status signal as an open drain output from the device; and
   electrically coupling an AVS status signal from each of the one or more secondary devices to the open drain output from the device.

6. The method of claim 1, wherein the selectively adjusting the output voltage comprises controlling the output voltage via an output of an AVS digital to analog converter connected to a node among resistors in a voltage divider operatively connected to a feedback node of the DC-DC converter.

7. The method of claim 1, wherein the selectively adjusting the output voltage comprises controlling the output voltage via an Inter-Integrated Circuit control.

8. The method of claim 1, wherein the monitoring the one or more parameters comprises monitoring one or more process monitors associated with performance of the primary device and the one or more secondary devices by an AVS control loop in the primary device.

9. An apparatus, comprising:
   a direct current-to-direct current (DC-DC) converter configured to control at least one device; and
   an adaptive voltage scaling (AVS) controller operatively connected to the DC-DC converter, wherein the AVS controller is configured to:
      monitor one or more parameters associated with performance of a primary device and one or more secondary devices that are driven by the DC-DC converter; and
      selectively adjust an output voltage of the DC-DC converter based on a result of a comparison of a voltage target and the one or more parameters to a power supply voltage.

10. The apparatus of claim 9, wherein the AVS controller comprises:
    a control loop operatively connected to a switch node of the DC-DC converter; and
    a digital to analog (DAC) converter operatively connected to a feedback node of the DC-DC converter.

11. The apparatus of claim 10, further comprising:

a voltage divider operatively connected to the DC-DC converter and the AVS controller; and a resistor comprising a first terminal and a second terminal, wherein the first terminal is operatively connected to the DAC and the voltage divider, and wherein the second terminal is connected to electrical ground.

12. The apparatus of claim 11, wherein the resistor is a first resistor, and wherein the voltage divider comprises a second resistor and a third resistor, and wherein the second resistor and the third resistor are operatively connected to a feedback node of the DC-DC converter.

13. The apparatus of claim 11, wherein an output of the AVS controller is sourced into the voltage divider, and wherein the AVS controller facilitates an adjustment of the output voltage from the DC-DC converter via a feedback node.

14. The apparatus of claim 11, wherein the AVS controller and the resistor are operatively connected in a series configuration.

15. The apparatus of claim 9, wherein the one or more secondary devices are operatively connected to the primary device via a single connection point.

16. The apparatus of claim 9, wherein the apparatus is a microcontroller operatively connected to a die-to-die interface comprising a plurality of dies, and wherein the DC-DC converter is controlled via an Inter-Integrated Circuit.

17. A method, comprising:

operatively connecting a direct current-to-direct current (DC-DC) converter and an adaptive voltage scaling (AVS) controller;

monitoring, by the AVS controller, one or more parameters associated with performance of a primary device and one or more secondary devices that are driven by the DC-DC converter; and adjusting, by the AVS controller, an output voltage of the DC-DC converter via a feedback loop based on a result of a comparison between a voltage target and the one or more parameters to a power supply voltage.

18. The method of claim 17, wherein the adjusting comprises:

based on a first determination that the power supply voltage is less than the voltage target, driving an adaptive voltage scaling (AVS) status signal from a first value to a second value; and based on the driving the AVS status signal from the first value to the second value, increasing a value of the output voltage from the DC-DC converter as compared to a present value of the output voltage.

19. The method of claim 18, further comprising:

based on a second determination that the power supply voltage is equal to or more than the voltage target, driving the AVS status signal from the second value to the first value, and based on the driving the AVS status signal from the second value to the first value, increasing the value of the output voltage from the DC-DC converter as compared to the present value of the output voltage.

20. The method of claim 17, further comprising:

operatively connecting a feedback node of the DC-DC converter to a voltage divider that comprises a first resistor and a second resistor connected in a series configuration; and operatively connecting a third resistor in series with a digital to analog converter (DAC), wherein a first terminal of the second resistor is connected to the first resistor and the feedback node, and wherein a second terminal of the second resistor is connected to a first terminal of the third resistor and the DAC, and wherein a second terminal of the third resistor is connected to electrical ground.

\* \* \* \* \*